United States Patent
Lippert et al.

(10) Patent No.: US 6,626,957 B1
(45) Date of Patent: Sep. 30, 2003

(54) MARKUP LANGUAGE CONTENT AND CONTENT MAPPING

(75) Inventors: Lisa M. Lippert, Seattle, WA (US); Andrew Sinclair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/410,652

(22) Filed: Oct. 1, 1999

(51) Int. Cl.[7] .............................................. G06F 17/00
(52) U.S. Cl. ...................................... 715/513; 707/101
(58) Field of Search ........................... 715/513; 707/101

(56) References Cited

U.S. PATENT DOCUMENTS

| | | | | |
|---|---|---|---|---|
| 5,754,306 A | * | 5/1998 | Taylor et al. | 358/400 |
| 5,923,848 A | * | 7/1999 | Goodhand et al. | 709/219 |
| 6,088,717 A | * | 7/2000 | Reed et al. | 709/201 |
| 2002/0147747 A1 | * | 10/2002 | Zaharkin | 707/513 |
| 2003/0014421 A1 | * | 1/2003 | Jung | 707/102 |

OTHER PUBLICATIONS

XSL Transformations (XSLT), Version 1.0, W3C Working Draft Aug. 13, 1999,http://www.w3.org/1999/08/WD-xslt-19990813.*

Goland, HTTP Extensions for Distributed Authoring—WebDAV WebDAVA Network Working Group, Request for Comments 2518, Feb. 1999.*

E. James Whitehead and Meredith Wiggins. WEBDAV: IETF Standard for Collaborative Authoring on the Web. IEEE Internet Computing, pp. 34–40, Sep./Oct. 1998.*

Dawson, Frank, "The vCard v3.0 XML DTD" http://www-.globecom.net/ietf/draft/draft-dawson-vcard-xml-dtd-02.html.*

E. James Whitehead, Jr., WebDAV: An Introduction, StandardView, vol. 5, No. 1, pp. 3–8, Mar. 1, 1997.

R. Fielding, et al., HTTP/1.1, HTTP Working Group, Internet Draft, Nov. 18, 1998.

T. Bray, et al., XML 1.0, REC-xml-19980210, Feb. 10, 1998.

* cited by examiner

Primary Examiner—Heather R. Herndon
Assistant Examiner—Adam Queler
(74) Attorney, Agent, or Firm—Workman, Nydegger

(57) ABSTRACT

Markup language content and content mapping is disclosed. On one embodiment, content is received according to a first predetermined format, such as MAPI. The content is mapped from this format to a second predetermined format which is consistent with a predetermined markup language, such as XML. The second format may also be consistent with a predetermined extension of the markup language, such as the WebDAV extensions to XML. Once mapped, the content is output in the second format.

14 Claims, 4 Drawing Sheets

MARKUP LANGUAGE CONTENT AND CONTENT MAPPING

FIELD OF THE INVENTION

This invention relates generally to markup languages such as eXtensible Markup Language (XML), and more specifically to mapping content so that it can be exposed in markup language format, such as XML format, as well as content in the markup language format.

BACKGROUND OF THE INVENTION

The HyperText Transport Protocol (HTTP) has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto. HTTP as referred to herein refers generally to any standard of HTTP, and specifically to HTTP/1.1, as described in the HTTP Working Group Internet Draft dated Nov. 18, 1998, prepared by Fielding, et al., and available on the web site http://www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is eXtensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are subsets of a markup language known as Standard Generalized Markup Language (SGML). XML as referred to herein refers generally to any standard of XML, and specifically to XML 1.0, as described in the W3C recommendation REC-xml-19980210 dated Feb. 10, 1998, and also available on the web site http://www.w3.org.

HTTP, and hence XML in the context of HTTP, allows for the access of resources. The term resource refers to any piece of information that has a location described by a Uniform Resource Locator (URL) of the form HTTP://<domain>/<sub>/<resource>.<extension>, where <domain> specifies a particular domain, <sub> is a subdirectory, <resource> is a resource, and <extension>can be, for example, .com, .edu, and .net, among others. A resource can be, for example, a Web page, a hierarchical collection of information such as folders, a document, a database, a bitmap image, or a computational object. Recently, extensions to HTTP have been proposed that, among other things, allow for better access to resources over HTTP. The extensions are generally referred to as the World-Wide-Web Distributed Authoring and Versioning (WebDAV) extensions to HTTP. The goal of WebDAV, broadly speaking, has been to add remote authoring capabilities to HTTP, so that HTTP can be more convenient as a readable and writable collaborative medium, and not necessarily only a browsing medium for web pages.

WebDAV is generally described in the reference E. James Whitehead, Jr., World-Wide-Web Distributed Authoring and Versioning (WebDAV): An Introduction, in StandardView, Vol. 5, No. 1, March 1997, pages 3–8. WEBDav is also described in the reference Internet Engineering Task Force (IETF) Request for Comment (RFC) 2518, entitled HTTP Extensions for Distributed Authoring, by Y. Goland, E. Whitehead, A. Faizi, S. Carter and D. Jensen, and dated February 1999. Generally, this latter reference specifies a set of methods, headers and content-types ancillary to HTTP/1.1 for the management of resource properties, creation and management of resource collections, name space manipulation, and resource locking (also referred to as collision avoidance).

Data, also referred to as information or content, may be able to be retrieved from databases or other stores in XML format, in accordance with, for example, the WebDAV extensions to XML. However, many legacy databases and other stores are not retrievable in XML format. For example, servers running Microsoft® Exchange® server software store content in a format consistent with the Mail Application Programming Interface (MAPI) developed by Microsoft®. As a result, utilizing such servers in the context of XML and WebDAV is difficult, since these servers cannot return information in XML format. This limits the usefulness of XML, since many legacy databases abound. For this and other reasons, there is a need for the present invention.

SUMMARY OF THE INVENTION

The invention relates to markup language content and content mapping. For example, in one embodiment, content is received according to a first predetermined format, such as MAPI. The content is mapped from this format to a second predetermined format which is consistent with a predetermined markup language, such as XML. The second format may also be consistent with a predetermined extension of the markup language, such as the WebDAV extensions to XML. Once mapped, the content is output in the second format.

Embodiments of the invention therefore provide for advantages not found in the prior art. Information stored in legacy formats such as MAPI are nevertheless retrievable in markup language format in accordance with embodiments of the invention. Embodiments of the invention allow for such information to be converted to markup language format, such as XML format. This makes markup language formats like XML more useful, since they can be used in the context of already-existing databases and other information stores.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
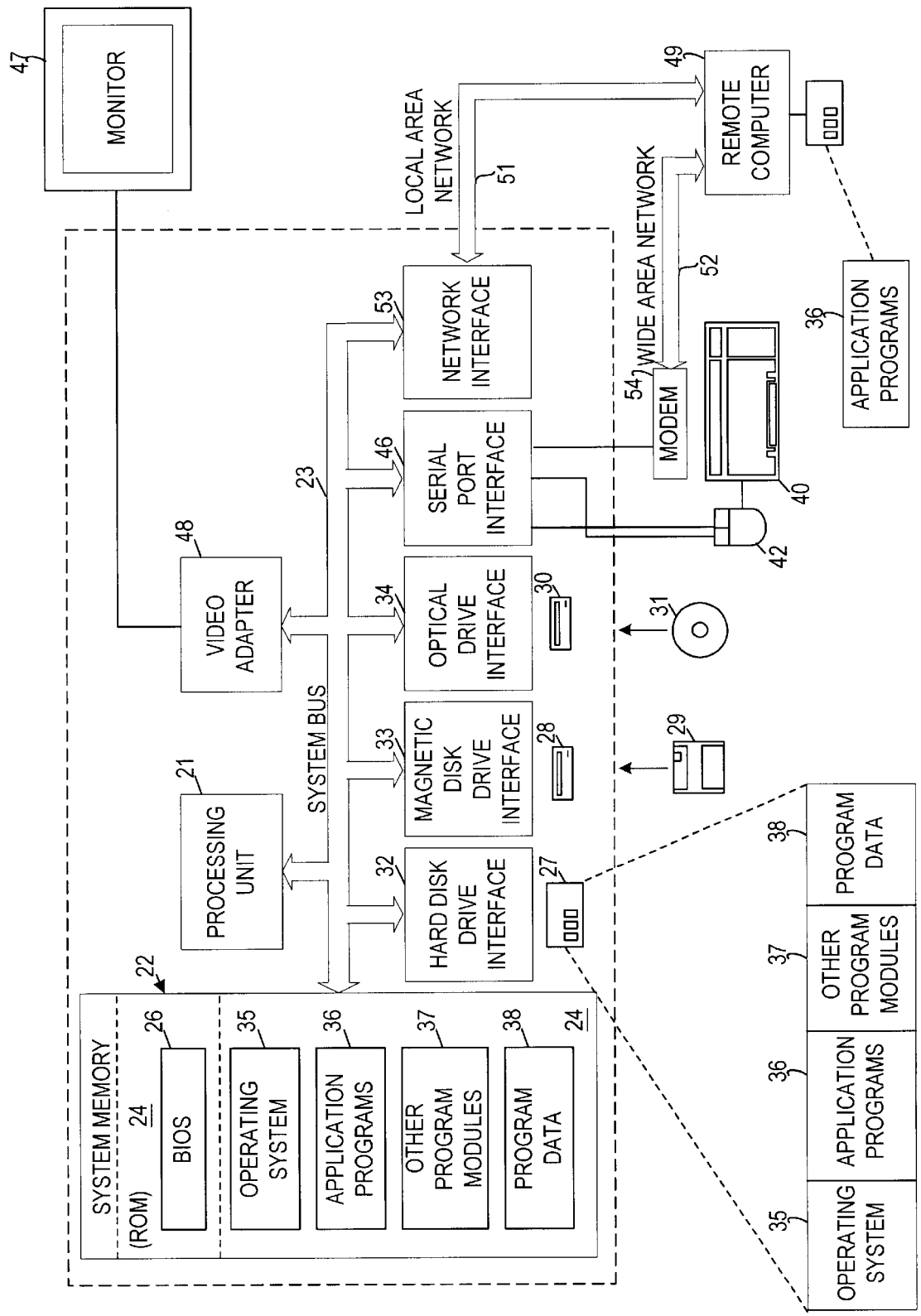
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Content Mapping Method

In this section of the detailed description, content mapping, in a computer-implemented method embodiment of the invention, is described. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The method described herein is described in relation to a specific example. This is just for illustrative purposes, however, the invention is not so limited.

Figure 2:
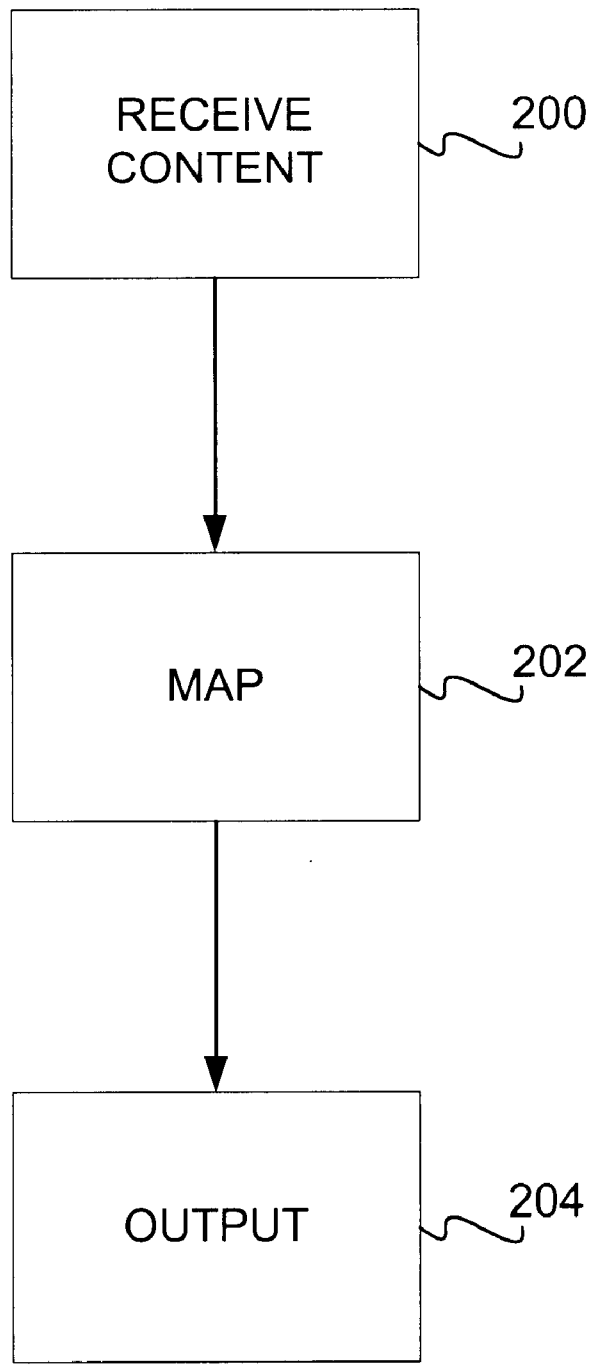
FIG. 2 is a flowchart of a method according to an embodiment of the invention.

Referring to FIG. 2, a flowchart of a method according to an embodiment of the invention is shown. In 200, content according to a first predetermined format is received. For example, the content may be entered into memory, or may be read from a storage such as a hard disk drive, or may be received from a communications device such as a network adapter or a modem; the invention is not so limited. In one embodiment, the first predetermined format is MAPI, as has been described. An example is the field PR_CUSTOMER_ACCOUNT Note that this field itself may correspond to an internal identifier, which can be in hexadecimal format, such as 0x1FD08F82. An example content of the MAPI field is "Howard Enterprises."

In 202, the content according to the first predetermined format is mapped to a second predetermined format, where the second predetermined format is consistent with a predetermined markup language, such as XML. Furthermore, the second predetermined format may also be consistent with a predetermined extension of the markup language, such as the WebDAV extensions to XML. An example name in XML format as extended by WebDAV is "urn:schemes-:contacts:account". Thus, the field PR_CUSTOMER_ACCOUNT is mapped to this XML name, such that the example content of "Howard Enterprises" is mapped as the content stored at this XML name.

Desirably, the content in the markup language is provided in a markup language container, which identifies the content. For example, in the context of XML, an example container is, <?xml version="1.0"?>
<contacts>
   XML properties go here.
</contacts>

In one embodiment of the invention, several different contents can be provided in the same XML container. For example, where the content relates to information for contacts, there may be content relating to a number of different contacts in the same container. This can be for such purposes as archiving, uploading, etc.; the invention is not so limited.

Finally, in 204, the content, as has been mapped to the second predetermined format consistent with the markup language, is output. The invention is not limited to the manner by which output is accomplished. For example, in one embodiment, output can be to a further program or software component. As another example, output can be displayed on a displayed device, or printed to a printer, etc. As a third example, the output can be stored on a storage device or memory, transmitted to a communications device, etc.

One-to-Many and Many-to-One Content Mapping

The example of the previous section of the detailed description is a one-to-one mapping. That is, a single field of the first predetermined format is mapped to a single name of the second predetermined format, such that the content in the former field is mapped on a one-to-one basis to the content in the latter field. However, the invention is not so limited. As described in this section, one-to-many and many-to-one content mappings are also provided by embodiments of the invention.

As a first example, one-to-many content mappings are described. For example, in MAPI, a PR_X5DO_INFO field may have values defined therefor as {0=Company, 1=Seattle}. The content for this field is thus a singular {0=Company, 1=Seattle}. This can be mapped to XML format as the plural, urn:schemas:contacts:0="Company"
urn:schemas:contacts:1="Seattle"

such that the resultant mapping is one to many.

As a second example, many-to-one content mappings are described. For example, in MAPI, a first field PR_FIRSTNAME having the content "Sally" and a second field PR_LASTNAME having the content "Jones" may be defined. Because there are two fields, the content over these two fields is plural. This can be mapped to XML format as a singular mapping, urn:schemas:contacts:fileas "Jones, Sally", such that the resultant mapping is many to one.

As a final example, format changes are also possible under embodiments of the invention. For example, a MAPI field PR_HOME_PHONE may list a phone number as "AAAPPPNNNN," where AAA are the area code digits, PPP are the prefix digits, and NNN are the last four digits of the phone number. This can be changed when it is mapped into XML, for example, as urn:schemas:contacts:phone="1-AAA-PPP-NNNN", where the preceding "1", as well as the dashes "-", have been added. The format changes can also be such that aspects of the format in the first predetermined format are removed when mapped to the second predetermined format.

System

Figure 3:
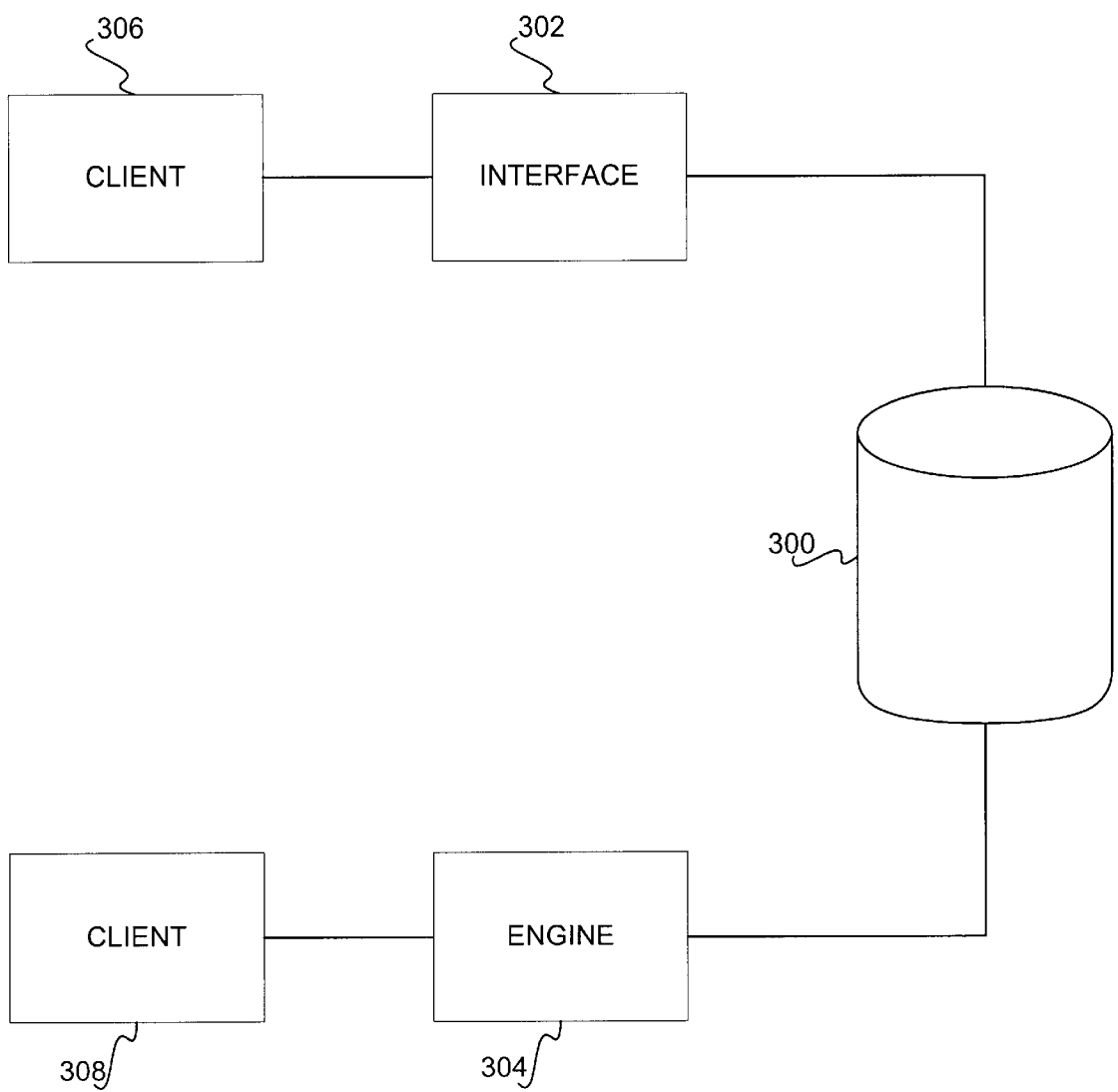
FIG. 3 is a diagram of a system according to an embodiment of the invention; and, FIG. 4 is a flowchart of another method according to an embodiment of the invention.

In this section of the detailed description, a description of a system according to an embodiment of the invention is provided. The description is made with reference to FIG. 3. The storage 300 has internal fields identified as hexadecimal numbers. The storage 300 can be a simple storage, such as a hard disk drive, or can be a complete server computer, having as a component thereof a simple storage. The storage 300 stores content as organized by the internal fields.

The content within the fields themselves can be accessed according to a first predetermined format, such as MAPI, by the interface 302, which can be an application program interface (API), such as known within the art. The content within the fields can also be accessed according to a second predetermined format, such as XML as extended by WebDAV, by the engine 304, which can be a computer program, etc. Where the storage 300 is a legacy database, the engine 304 allows for access to the content stored therein by mapping the content received from the first predetermined format to the second predetermined format consistent with a predetermined markup language as has been described.

Thus, client programs such as the program 306 that are understanding of the first predetermined format, such as legacy clients knowledgeable of MAPI, can access the storage 300 using the interface 302. However, clients that are not understanding of the first predetermined format, but are understanding of the second predetermined format consistent with the predetermined markup language, such as the client program 308, can access the storage 300 using the engine 304. In such instances, the engine 304 may receive the content from the storage 300 as formatted in the first predetermined format, and therefore must map the content to the second predetermined format consistent with the predetermined markup language prior to outputting the content to the client 306.

Transmission of Mapped Content

In this section of the detailed description, description is provided of the manner by which transmission of mapped content, according to a transport protocol, as the content has been mapped according to a markup language, according to one embodiment of the invention. The transmission can be in one embodiment performed as a computer-implemented method. In such instance, the computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 4:
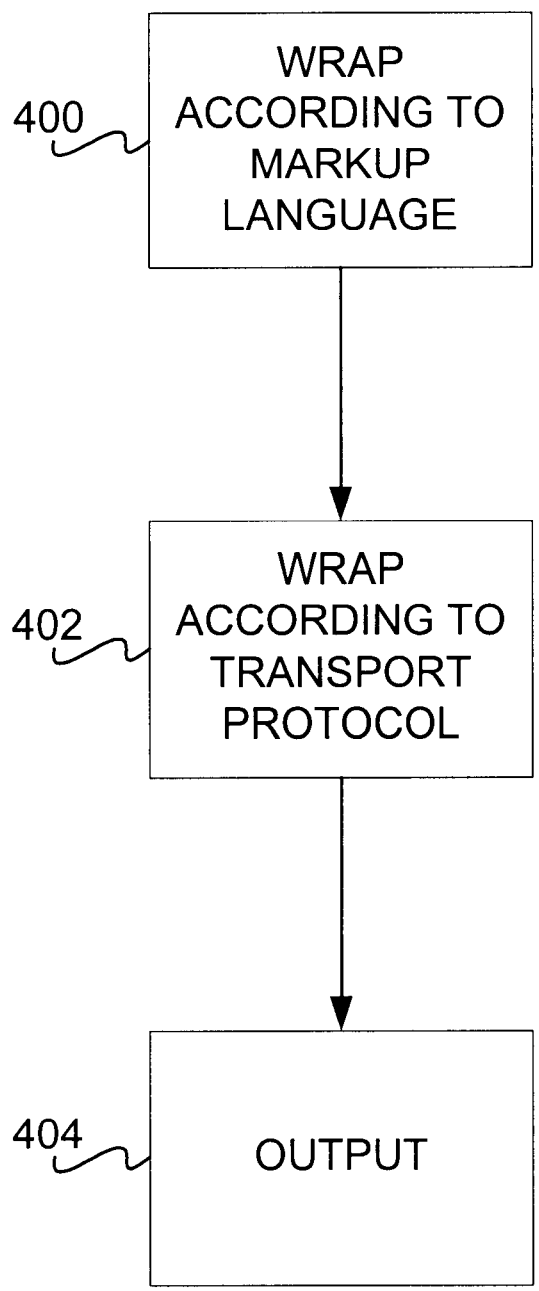

Referring to FIG. 4, in 400, mapped content in accordance with a markup language is received, and then wrapped according to the markup language. For example, the mapping can be as has been described in previous sections of the detailed description. In one embodiment, the markup language is XML, specifically XML 1.0 as has been described in the background section.

Such a wrapping can be performed as follows. First, the content is surrounded by predetermined indicators to indicate the start and stop of the content, such as <contacts> and </contacts>. Next, the content is further surrounded by predetermined indicators to indicate the predetermined markup language that is used for wrapping, as well as to indicate anything required by that predetermined markup language, such as its version. For example, the content can be preceded by <?xml version="1.0"?> and succeeded by </x:searchrequest>. The <?xml version="1.0"?> specifies that XML is the predetermined markup language used, specifically version 1.0.

Next, in 402, the content is further wrapped according to a predetermined transport protocol. In one embodiment, the predetermined protocol is HTTP, specifically HTTP 1.1 as has been described in the background section. The content, as already wrapped according to predetermined markup language, is preceded by predetermined indicators to indicate the transport protocol that is used for wrapping, as well as to indicate anything required by that protocol, such as its version, a host location, content type, connection type, and content-length. For example, the content as wrapped according to the predetermined markup language, is preceded by the following:

SEARCH/HTTP/1.1

Host: ryu.com

Content-Type: text/xml

Connection: Close

Content-Length: 243

The SEARCH/HTTP/1.1 specifies that the text that follows relates to a search, and that the transport protocol is HTTP 1.1. The Host: ryu.com specifies the host where the resource is located. The Content-Type: text/xml specifies that what is being sent is text according to the XML markup language. The Connection: Close specifies whether or not the server should try and maintain the network connection after the request is completed, while Content-Length: 243 specifies the size of the request body, in characters.

Thus, the entire content, as first converted and wrapped according to the predetermined markup language and according to the predetermined transport protocol, is in the example,

SEARCH/HTTP/1.1

Host: ryu.com

Content-Type: text/xml

Connection: Close

Content-Length: 243

<?xml version="1.0"?>

<contacts>

XML properties go here.

</contacts>

This can then be output, in 404. The invention is not limited to the manner of output. For example, it can be sent from a server computer to a client computer over a network, such as the Internet, an intranet, or an extranet.

Specific Embodiments

In this section of the detailed description, specific embodiments of the invention are described. As those of ordinary skill within the art can appreciate, however, the invention is not limited to these specific embodiments. Rather, they are presented to illustrate specific manners by which the invention can be practiced. The embodiments described herein are in the context of content that is related to contact information, such as name, address, phone number, etc.; however, again, the invention is not so limited.

First, contact containers are described. XML containers have already been described in a previous section of the detailed description. As used in this section, the terminology "contact containers" refers to the use of an XML or other container to encapsulate more than one piece of content information. For example, some documents may contain more information about more than one contact. This element is defined in order to encapsulate a contact. It may appear multiple times in the same document or the same scope. If it occurs more than once, each set of XML encapsulated by this element is a distinct contact record. Within this element, most elements can appear only once (Exceptions are noted in the definitions of each data element).

Use of this element as a container is optional. When contact information is included as part of the property set of a DAV resource, for example, this container will not be used (each data element will instead be a property). Alternatively, other XML document types may reference this specification and reuse these components; for example, an XML-based document format could define an "author" container to hold data elements defined in this document.

A contact container is specifically defined as,

XML Element name: contact

XML Element type: Element container

Description: Contains XML elements, particularly all the properties defined for the urn:schemas:contacts: namespace.

An example of such a container is

```
<?xml version="1.0">
  <contact xmlns="urn:schemas:contacts:">
    <cn>Barbara Jensen</cn>
    <email1>babs@umich.edu</email 1>
    <homefax>+1-888-555-1212</homefax>
  </contact>
  <contact>
    <cn>Heather Ericson</cn>
    <Telephone>+123-4567</Telephone>
  </contact>
  <contact>
    <fileas>Gidget's Gadgets Inc.</fileas>
    <o>Gidget's Gadgets Inc.</o>
    <Telephone>+1-222-234-5678</Telephone
21 /contact>
```

It is noted that each separate element is surrounded by predetermined indicators. A first, or leading, such indicator denotes the start of a new element. In the example above, the leading indicator is <contact>. A second, or trailing, such indicator denotes the end of an element. In the example above, the trailing indicator is </contact>. Thus, the difference between the leading and the trailing indicator is the presence of a slash in the latter that is not present in the former.

Next, specific data elements and property definitions are provided. These elements and definitions can be used in conjunction with embodiments of the invention, as the type of content inserted in an XML container, for example. As another example, the content can be described or formated in accordance with the elements and definitions provided herein, and then be output, such as being transmitted to another computer over a network like the Internet.

Some of the specific data elements and property definitions are described in relation to standards known to those of ordinary skill within the art. For example, some of the elements are stated as being defined by the Lightweight Directory Assistance Protocol (LDAP), which is a standard protocol used to maintain directory information for contacts. Thus, such elements are consistent with LDAP. As another example, some of the elements are stated as being defined by one of a number of International Standards Organization (ISO) standards, such as ISO 3316. ISO, as known in the art, is an international organization that promulgates standards on a variety of issues, including naming conventions such as those described here. Thus, elements stated as defined in conjunction with an ISO standard are consistent with the stated ISO standard. Other standards in conjunction with which some of the elements are described as being defined by include VCard, MIME, etc., which are all known in the art.

1. 'account' element

XML Element name: account

Default data type: string

Example: <account>343432543534</account>

Description: The account number or other account identifier.

2. 'bday' element

XML Element name: bday

Default data type: Date

Example: <bday>1953-01-02</bday>

Description: The birth date (defined in VCard).

3. 'businesshomepage' element

XML Element name: businesshomepage

Default data type: uri

Example: <businesshomepage>http://www.mybiz.com</businesshomepage>

Description: The business home page for the contact

4. 'c' element

XML Element name: c

Default data type: String (ISO 3166)

Example: <c>CA</c>

Description: Defined by LDAP. The ISO 3166 Country code.

5. 'children' element

XML Element name: children

Default data type: String

Example: <children>jim;jane</children>

Description: List of children's names, separated by semicolons.

6. 'cn' element

XML Element name: cn

Default data type: String

Example: <cn>Barbara Jensen</cn>

Description: Defined by LDAP. The commonly-used name.

7. 'co' element

XML Element name: co

Default data type: String

Example: <co>Canada</co>

Description: Defined by LDAP. The friendly name of the work country.

8. 'computernetworkname' element
   XML Element name: computernetworkname
   Default data type: String
   Example: <computernetworkname>domain:Redmond</computernetworkname>
   Description: Arbitrary string referring to a computer network.

9. 'customerid' element
   XML Element name: customerid
   Default data type: String
   Example: <customerid>1234567890</customerid>
   Description: A customer identifier (arbitrary string).

10. 'department' element
    XML Element name: department
    Default data type: String
    Example: <department>Internet Technology Division</department>
    Description: Defined by LDAP. The department name.

11. 'dn' element
    XML Element name: dn
    Default data type: String
    Example: <dn>cn=andrew</dn>
    Description: Defined by LDAP. The "distinguished name".

12. 'email1' element
    XML Element name: email1
    Default data type: String (valid mailto address)
    Example: <email1>babs@umich.edu</email1>
    Description: Defined by LDAP as "email". The primary internet email address.

13. 'email2' element
    XML Element name: email2
    Default data type: String (valid mailto address)
    Example: <email2>babs@umich.edu</email2>
    Description: Same LDAP definition as "email". The secondary internet email address.

14. 'email3' element
    XML Element name: email3
    Default data type: String (valid mailto address)
    Example: <email3>babs@umich.edu</email3>
    Description: Same LDAP definition as "email". A backup internet email address.

15. 'employeenumber' element
    XML Element name: employeenumber
    Default data type: String
    Example: <employeenumber>11221</employeenumber>
    Description: Defined by LDAP. The employee number or ID.

16. 'facsimileTelephoneNumber' element
    XML Element name: facsimileTelephoneNumber
    Default data type: String (phone number)
    Example: <facsimileTelephoneNumber>+1-222-333-4444</facsimileTelephoneNumber>
    Description: Defined by LDAP. The facsimile machine phone number.

17. 'fileas' element
    XML Element name: fileas
    Default data type: String
    Example: <fileas>11221</fileas>
    Description: Defined by LDAP as "displayName". The string used to file this record (useful for ordering).

18. 'ftpsite' element
    XML Element name: ftpsite
    Default data type: uri
    Example: <ftpsite>ftp://ftp.mybiz.com</ftpsite>
    Description: The FTP site address.

19. 'givenName' element
    XML Element name: givenName
    Default data type: String
    Example: <givenName>Barbara</givenName>
    Description: Defined by LDAP. The first name or given name.

20. 'governmentid' element
    XML Element name: governmentid
    Default data type: String
    Example: <governmentid>333222111</governmentid>
    Description: The government id. For example, the social insurance number in Canada.

21. 'hobbies' element
    XML Element name: hobbies
    Default data type: String
    Example: <hobbies>skiing; knitting</hobbies>
    Description: A list of hobbies, separated by semi-colons.

22. 'homeCity' element
    XML Element name: homeCity
    Default data type: String
    Example: <homeCity>Toronto</homeCity>
    Description: The city of the home address.

23. 'homeCountry' element
    XML Element name: homeCountry
    Default data type: String
    Example: <homeCountry>Canada</homeCountry>
    Description: The country of the home address.

24. 'homefax' element
    XML Element name: homefax
    Default data type: String (phone number)
    Example: <homefax>+1-888-555-1212</homefax>
    Description: The facsimile number at home.

25. 'homePhone' element
    XML Element name: homePhone
    Default data type: String (phone number)
    Example: <homePhone>+1-888-555-1212</homePhone>
    Description: The phone number at home.

26. 'homephone2' element
    XML Element name: homephone2
    Default data type: String (phone number)
    Example: <homephone2>+1-888-555-1212</homephone2>
    Description: Another phone number at home.

27. 'homepostaladdress' element
    XML Element name: homepostaladdress
    Default data type: String
    Example: <homepostaladdress>39 King St. W, Winterbourne, Ontario, Canada N0B1N0</homepostaladdress>
    Description: The entire postal address.

28. 'homePostalCode' element
   XML Element name: homePostalCode
   Default data type: String
   Example: <homePostalCode>N0B1N0</homePostalCode>
   Description: The postal code of the home address.
29. 'homepostofficebox' element
   XML Element name: homepostofficebox
   Default data type: String
   Example: <homepostofficebox>1212</homepostofficebox>
   Description: The post office box number of the home address.
30. 'homeState' element
   XML Element name: homeState
   Default data type: String
   Example: <homeState>WA</homeState>
   Description: The state of the home address.
31. 'homeStreet' element
   XML Element name: homeStreet
   Default data type: String
   Example: <homeStreet>39 King St. W</homeStreet>
   Description: The street of the home address.
32. 'hometimezone' element
   XML Element name: hometimezone
   Default data type: String
   Example: <hometimezone>GMT+1:00</hometimezone>
   Description: The time zone of the home address.
33. 'initials' element
   XML Element name: initials
   Default data type: String
   Example: <initials>RMBD</initials>
   Description: The initials (first letters of full name)
34. 'internationalisdnnumber' element
   XML Element name: internationalisdnnumber
   Default data type: String (phone number)
   Example: <internationalisdnnumber>+1-44-425-7898897</internationalisdnnumber>
   Description: Phone number in international format.
35. '1' element
   XML Element name: 1
   Default data type: String
   Example: <1>Winterbourne</1>
   Description: Locality (from X500)
36. 'language' element
   XML Element name: language
   Default data type: String
   Example: <language>DE</language>
   Description: Preferred spoken or written language of the contact. Does not support multiple languages.
37. 'location' element
   XML Element name: location
   Default data type: String
   Example: <location>building 43</location>
   Description: Location, i.e. within a campus
38. 'mailingcity' element
   XML Element name: mailingcity
   Default data type: String
   Example: <mailingcity>Toronto</mailingcity>
   Description: Full name of city of mailing address.
39. 'mailingcountry' element
   XML Element name: mailingcountry
   Default data type: String
   Example: <mailingcountry>Canada</mailingcountry>
   Description: Full name of country of mailing address.
40. 'mailingpostaladdress' element
   XML Element name: mailingpostaladdress
   Default data type: String
   Example: <mailingpostaladdress>39 King St. W, Winterbourne, Ontario, Canada N0B1N0</mailingpostaladdress>
   Description: The entire postal address of the mailing address.
41. 'mailingPostalCode' element
   XML Element name: mailingPostalCode
   Default data type: String
   Example: <mailingPostalCode>N0B1N0</mailingPostalCode>
   Description: The postal code of the mailing address.
42. 'mailingpostofficebox' element
   XML Element name: mailingpostofficebox
   Default data type: String
   Example: <mailingpostofficebox>1212</mailingpostofficebox>
   Description: The post office box number of the mailing address.
43. 'mailingState' element
   XML Element name: mailingState
   Default data type: String
   Example: <mailingState>WA</mailingState>
   Description: The state of the mailing address.
44. 'mailingStreet' element
   XML Element name: mailingStreet
   Default data type: String
   Example: <mailingStreet>39 King St. W</mailingStreet>
   Description: The street of the mailing address.
45. 'manager' element
   XML Element name: manager
   Default data type: String
   Example: <manager>Deborah Sturby</manager>
   Description: The name of the manager.
46. 'managerurl' element
   XML Element name: managerurl
   Default data type: String
   Example: <managerurl>mailto://dsturby@widget.com</managerurl>
   Description: The URL (typically the LDAP URL) of the manager.
47. 'mapurl' element
   XML Element name: mapurl
   Default data type: String
   Example: <mapurl>http://www.map.com?id=1234</mapurl>
   Description: URL to a map.
48. 'middlename' element
   XML Element name: middlename
   Default data type: String
   Example: <middlename>Maurice Bernard</middlename>
   Description: Middle name, or names.

49. 'mobile' element
    XML Element name: mobile
    Default data type: String (phone number)
    Example: <mobile>+1-519-555-1212</mobile>
    Description: Phone number of a mobile or cellular phone.
50. 'namesuffix' element
    XML Element name: namesuffix
    Default data type: String
    Example: <namesuffix>Esquire</namesuffix>
    Description: The suffix on a name or generational qualifier.
51. 'nationality' element
    XML Element name: nationality
    Default data type: String
    Example: <nationality>Canadian</nationality>
    Description: The nationality or citizenship.
52. 'nickname' element
    XML Element name: nickname
    Default data type: String
    Example: <nickname>Lefty</nickname>
    Description: The nickname or casual name.
53. 'o' element
    XML Element name: o
    Default data type: String
    Example: <o>Cascade Gaskets, Inc.</o>
    Description: The organization or company name.
54. 'office2telephonenumber' element
    XML Element name: office2telephonenumber
    Default data type: String (phone number)
    Example: <office2telephonenumber>+1-519-555-1212</office2telephonenumber>
    Description: The secondary office telephone number.
55. 'officetelephonenumber' element
    XML Element name: officetelephonenumber
    Default data type: String (phone number)
    Example: <officetelephonenumber>+1-519-555-1212</officetelephonenumber>
    Description: The office telephone number.
56. 'organizationmainphone' element
    XML Element name: organizationmainphone
    Default data type: String (phone number)
    Example: <organizationmainphone>+1-519-555-1212</organizationmainphone>
    Description: The main phone number of the organization referred to in 'o'.
57. 'organizationuri' element
    XML Element name: organizationuri
    Default data type: String
    Example: <organizationuri>www.cascadegasket.com</organizationuri>
    Description: A URI for the organization referred to in 'o'.
58. 'othercity' element
    XML Element name: otherCity
    Default data type: String
    Example: <otherCity>Toronto</otherCity>
    Description: The city of the 'other' address.
59. 'othercountry' element
    XML Element name: otherCountry
    Default data type: String
    Example: <otherCountry>Canada</otherCountry>
    Description: The country of the 'other' address.
60. 'othercountrycode' element
    XML Element name: othercountrycode
    Default data type: String (country code)
    Example: <othercountrycode>CA</othercountrycode>
    Description: The country code of the 'other' address.
61. 'otherfax' element
    XML Element name: otherfax
    Default data type: String (phone number)
    Example: <otherfax>+1-888-555-1212</otherfax>
    Description: The facsimile number at the 'other' address.
62. 'othermobile' element
    XML Element name: othermobile
    Default data type: String (phone number)
    Example: <othermobile>+1-888-555-1212</othermobile>
    Description: An alternative mobile telephone number.
63. 'otherpager' element
    XML Element name: otherpager
    Default data type: String (phone number)
    Example: <otherpager>+1-519-111-2222</otherpager>
    Description: Another pager number.
64. 'otherpostaladdress' element
    XML Element name: otherpostaladdress
    Default data type: String
    Example: <otherpostaladdress>10 Main St,
    Seattle, WA 98101</homepostaladdress>
    Description: The entire postal address. Note that the 'return' shown in the value of the
    XML property should be preserved and interpreted as a carriage return by clients.
65. 'otherpostalcode' element
    XML Element name: otherpostalcode
    Default data type: String
    Example: <otherpostalcode>98100</otherpostalcode>
    Description: The postal code of the 'other' address.
66. otherpostofficebox
    XML Element name: otherpostofficebox
    Default data type: String
    Example: <otherpostofficebox>1212</otherpostofficebox>
    Description: The post office box number of the 'other' address.
67. otherstate
    XML Element name: otherstate
    Default data type: String
    Example: <otherstate>WA</otherstate>
    Description: The state of the 'other' address.
68. otherstreet
    XML Element name: otherstreet
    Default data type: String
    Example: <otherstreet>39 King St. W</otherstreet>
    Description: The street of the 'other' address.
69. otherTelephone
    XML Element name: otherTelephone
    Default data type: String (phone number)
    Example: <otherTelephone>+1-888-555-1212</otherTelephone>

Description: The main telephone number at the 'other' address.
70. 'pager' element
   XML Element name: pager
   Default data type: String (phone number)
   Example: <pager>+1-519-111-2222</pager>
   Description: The pager number.
71. 'personalHomePage' element x
   XML Element name: personalHomePage
   Default data type: String
   Example: <personalHomePage>http://www.users.com/~fred</personalHomePage>
   Description: A URL to a personal home page.
72. 'personaltitle' element
   XML Element name: personaltitle
   Default data type: String
   Example: <personaltitle>Ms.</personaltitle>
   Description: The title to be used with the name.
73. 'postalcode' element
   XML Element name: postalcode
   Default data type: String
   Example: <postalcode>98100</postalcode>
   Description: The postal code of the default (normally work) address.
74. 'postofficebox' element
   XML Element name: postofficebox
   Default data type: String
   Example: <postofficebox>1212</postofficebox>
   Description: The post office box number of the default (normally work) address.
75. 'profession' element
   XML Element name: profession
   Default data type: String
   Example: <profession>Graphic Designer</profession>
   Description: Arbitrary string for job, role, occupation or profession.
76. 'referredby' element
   XML Element name: referredby
   Default data type: String
   Example: <referredby>Claire Lune</referredby>
   Description: Arbitrary string for referral.
77. 'roomnumber' element
   XML Element name: roomnumber
   Default data type: String
   Example: <roomnumber>263</roomnumber>
   Description: Room number, i.e. within a building.
78. 'secretary' element
   XML Element name: secretary
   Default data type: String
   Example: <secretary>cn=Claire Lune</secretary>
   Description: Arbitrary string to define the secretary.
79. 'secretarycn' element
   XML Element name: secretarycn
   Default data type: String
   Example: <secretarycn>Claire Lune</secretarycn>
   Description: The 'cn' of the secretary
80. 'secretaryphone' element
   XML Element name: secretaryphone
   Default data type: String
   Example: <secretaryphone>+1-519-666-8888</secretaryphone>
   Description: The phone number of the secretary.
81. 'secretaryurl' element
   XML Element name: secretaryurl
   Default data type: String
   Example: <secretaryurl>mailto:clune@cascadegasket.com</secretaryurl>
   Description: URL, e.g. LDAP URL, to define secretary.
82. 'sn' element
   XML Element name: sn
   Default data type: String
   Example: <sn>Sturby</sn>
   Description: Surname or last name.
83. 'sourceurl' element
   XML Element name: sourceurl
   Default data type: String
   Example: <sourceurl>mailto:clune@cascadegasket.com</sourceurl>
   Description: URL, e.g. LDAP URL, for the source of all this information.
84. spousecn
   XML Element name: spousecn
   Default data type: String
   Example: <spousecn>Joe Jackson</spousecn>
   Description: The common name of the spouse.
85. st
   XML Element name: st
   Default data type: String
   Example: <st>ON</st>
   Description: The state or province of the work address.
86. street
   XML Element name: street
   Default data type: String
   Example: <street>King St. W</street>
   Description: The street of the work address.
87. telephoneNumber
   XML Element name: telephoneNumber
   Default data type: String (phone number)
   Example: <telephoneNumber>+1-888-555-1212</telephoneNumber>
   Description: The main telephone number for the contact.
88. telephoneNumber2
   XML Element name: telephoneNumber2
   Default data type: String (phone number)
   Example: <telephoneNumber2>+1-888-555-1212</telephoneNumber2>
   Description: A secondary telephone number.
89. telexnumber
   XML Element name: telexnumber
   Default data type: String (phone number)
   Example: <telexnumber>+1-888-555-1212</telexnumber>
   Description: A telex number.
90. thumbnaillogo
   XML Element name: thumbnaillogo
   Default data type: Binary, hex-encoded (bin.hex) representation of an image.

Attributes: 'type'—value is a MIME type strying

Example: <thumbnaillogo type="image/gif">8AB8821CD8</thumbnaillogo>

Description: An image of the logo. This is similar to the VCard "Photo" property.

VCard uses a parameter to indicate what MIME type the image should be interpreted as, and an attribute is used here. The default type is GIF.

91. thumbnaillogouri

XML Element name: thumbnaillogouri

Default data type: uri

Example: <thumbnaillogouri>http://server/images/logo.gif</thumbnaillogouri>

Description: A URI to an image of the logo.

92. thumbnailphoto

XML Element name: thumbnailphoto

Default data type: Binary, hex-encoded (bin.hex) representation of a *.gif file.

Attributes: 'type'—value is a MIME type strying

Example: <thumbnailphoto type="image/jpeg">8AB8821CD8</thumbnailphoto>

Description: An image of the photo. Encoded as with 'thumbnaillogo'.

93. thumbnailphotouri

XML Element name: thumbnailphotouri

Default data type: uri

Example: <thumbnailphotouri>http://server/images/photo.gif</thumbnailphotouri>

Description: A URI to an image of the logo.

94. title

XML Element name: title

Default data type: String

Example: <title>Program Manager</title>

Description: The job title or other title.

95. ttytddphone

XML Element name: ttytddphone

Default data type: String (phone number)

Example: <ttytddphone>+1-888-555-1212</ttytddphone>

Description: A ttytdd phone number 96. usercertificate

XML Element name: usercertificate

Default data type: String

Example: <usercertificate>82AB3228C . . . </usercertificate>

Description: The X.509 user certificate.

97. weddinganniversary

XML Element name: weddinganniversary

Default data type: date

Example: <weddinganniversary>1973-07-01</weddinganniversary>

Description: The wedding anniversary date.

98. workaddress

XML Element name: workaddress

Default data type: String

Example: <workaddress>10 Main St, Seattle, WA 98101</workaddress>

Description: The entire work address.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for converting content received in a Mail Application Program Interface (MAPI) format to an eXtensible Markup Language (XML) format, comprising:

receiving content formatted in a Mail Application Program Interface (MAPI);

mapping the received content from the Mail Application Program Interface (MAPI) format to an eXtensible Markup Language (XML) format;

wrapping the mapped content in accordance with the eXtensible Markup Language (XML) format;

wrapping, in accordance with a predetermined transport protocol, the content as has already been wrapped in accordance with the eXtensible Markup Language (XML) format; and outputting the content in the eXtensible Markup Language (XML) format, as has been wrapped in the eXtensible Markup Language (XML) format and the predetermined transport protocol.

2. The method of claims 1, wherein the eXtensible Markup Language (XML) comprises World-Wide-Web Distributed Authoring and Versioning (WebDAV) extensions.

3. The method of claim 1, wherein mapping the content comprises one-to-one mapping.

4. The method of claim 1, wherein mapping the content comprises many-to-one mapping.

5. The method of claim 1, wherein mapping the content comprises one-to-many mapping.

6. A machine-readable medium having instructions stored thereon for execution by a processor to perform a method for converting content received in a Mail Application Program Interface (MAPI) format to an eXtensible Markup Language (XML) format, comprising:

receiving content formatted in a Mail Application Program Interface (MAPI);

mapping the received content from the Mail Application Program Interface (MAPI) format to an eXtensible Markup Language (XML) format;

wrapping the mapped content in accordance with the eXtensible Markup Language (XML) format;

wrapping, in accordance with a predetermined transport protocol, the content as has already been wrapped in accordance with the eXtensible Markup Language (XML) format; and outputting the content in the extensible Markup Language (XML) format, as has been wrapped in the eXtensible Markup Language (XML) format and the predetermined transport protocol.

7. The medium of claims 6, wherein the eXtensible Markup Language (XML), comprises World-Wide-Web Distributed Authoring and Versioning (WebDAV) extensions.

8. A computerized system comprising:

a storage to store content formatted in a Mail Application Program Interface (MAPI); and an engine for accessing and converting the content stored in a Mail Application Program Interface (MAPI) format to an eXtensible Markup Language (XML) format, the engine comprising computer executable instruction for
receiving the content formatted in a Mail Application Program Interface (MAPI);
mapping the received content from the Mail Application Program Interface (MAPI) format to an extensible Markup Language (XML) format;
wrapping the mapped content in accordance with the extensible Markup Language (XML) format;
wrapping, in accordance with a predetermined transport protocol, the content as has already been wrapped in accordance with the extensible Markup Language (XML) format; and
outputting the content in the extensible Markup Language (XML) format, as has been wrapped in the extensible Markup Language (XML) format and the predetermined transport protocol.

9. The system of claim 8, further comprising an interface to access the content according to the Mail Application Program Interface (MAPI) format.

10. The system of claim 9, wherein the eXtensible Markup Language (XML), comprises World-Wide-Web Distributed Authorizing and Versioning (WebDAV) extensions.

11. A computer-implemented method comprising:
inserting each of a plurality of elements corresponding to content in a container, including surrounding each element with a leading indicator comprising <contact> and a trailing indicator comprising </contact>; and outputting the container,
wherein at least one of the plurality of elements is selected from the group comprising: an account element surrounded by <account> and </account> indicators and denoting an account, a bday element surrounded by <bday>, and </bday> indicators and denoting a birth day; a businesshomepage element surrounded by <businesshomepage> and </businesshomepage> indicators and denoting a business home page; a c element surrounded by <c> and </c> indicators and denoting a country code; a children element surrounded by <children> and </children> indicators and denoting children separated by semi-colons; a cn element surrounded by <cn> and <cn> indicators and denoting a commonly-used name; a co element surrounded by <co> and </co> indicators and denoting a county; a computernetworkname element surrounded by <computernetworkname> and </computernetworkname> indicators and denoting an arbitrary string referring to a computer network; a customerid element surrounded by <customerid> and </customerid> indicators and denoting a customer identifier; a department element surrounded by <department> and </department> indicators and denoting a department name.

12. A computer-implemented method comprising:
inserting each of a plurality of elements corresponding to content in a container, including surrounding each element with a leading indicator comprising <contact> and a trailing indicator comprising </contact>; and outputting the container,
wherein at least one of the plurality of element is selected from the group comprising: a dn element surrounded by <dn> and </dn> indicators and denoting a distinguished name; an email1 element surrounded by <email1> and </email1> indicators and denoting primary email address; an employeenumber element surrounded by <employeenumber> and </employeenumber> indicators and denoting one of an employee number or ID; a facsimileTelephonenumber element surrounded by <facsimileTelephonenumber> and </facsimileTelephonenumber> indicators and denoting a facsimile machine phone number; a fileas element surrounded by <fileas> and </fileas> indicators and denoting a display name used for filing and ordering; a ftpsite element surrounded by <ftpsite> and </ftpsite> indicators and denoting an FTP site address; a givenName element surrounded by <givenName> and </givenName> indicators and denoting one of a first and given name; and a governmentid element surrounded by <governmentid> and </governmentid> indicators and denoting a government ID.

13. A computer-implemented method comprising:
inserting each of a plurality of elements corresponding to content in a container, including surrounding each element with a leading indicator comprising <contact> and a trailing indicator comprising </contact>; and outputting the container,
wherein at least one of the plurality of elements is selected from the group comprising: a homeCity element surrounded by <homeCity> and </homeCity> indicators and denoting a home address city; a homeCountry element surrounded by <homeCountry> and </homeCountry> indicators and denoting a home address country; a homePhone element surrounded by <homePhone> and </homePhone> indicators and denoting a homephone number; a homepostaladdress element surrounded by <homepostaladdress> and </homepostaladdress> indicators and denoting an entire home postal address; a homePostalCode element surrounded by <homePostalCode> and </homePostalCode> indicators and denoting a home address postal code; a homeState element surrounded by <homeState> and </homeState> indicators and denoting a home address state; and a homeStreet element surrounded by <homeStreet> and </homeStreet> indicators and denoting a home address street.

14. A computer-implemented method comprising:
inserting each of a plurality of elements corresponding to content in a container, including surrounding each element with a leading indicator comprising <contact> and a trailing indicator comprising </contact>; and outputting the container,
wherein at least one of the plurality of elements is selected from the group comprising: an initial element surrounded by <initials> and </initials> indicators and corresponding to first letters of a full name; a st element surrounded by <st> and </st> indicators and corresponding to one of a work address state and a work address province; a street element surrounded by <street> and </street> indicators and corresponding to a work address street; a telephoneNumber element surrounded by <telephoneNumber> and </telephoneNumber> indicators and corresponding to a primary telephone number; and a workaddress element surrounded by <workaddress> and </workaddress> indicators and corresponding to an entire work address.

* * * * *

UNITED STATES PATENT AND TRADEMARK OFFICE
CERTIFICATE OF CORRECTION

PATENT NO.    : 6,626,957 B1
DATED         : September 30, 2003
INVENTOR(S)   : Lippert et al.

It is certified that error appears in the above-identified patent and that said Letters Patent is hereby corrected as shown below:

Column 2,
Line 12, after "pages 3-8." please delete "WEBDav" and insert -- WebDAV --

Column 7,
Line 9, after "digits, and" please delete "NNN" and insert -- NNNN --

Column 9,
Line 55, before "/contact>" please delete "21" and insert -- < --

Column 10,
Line 2, after "described or" please delete "formated" and insert -- formatted --

Column 20,
Line 28, after "method of" please delete "claims" and insert -- claim --
Line 59, after "medium of" please delete "claims" and insert -- claim --

Column 22,
Line 9, after "and ordering;" please delete "a" and insert -- an --
Line 53, after "full name;" please delete "a" and insert -- an --

Signed and Sealed this

Twenty-fifth Day of May, 2004

JON W. DUDAS
*Acting Director of the United States Patent and Trademark Office*